(12) United States Patent
Letocart et al.

(10) Patent No.: US 9,089,997 B2
(45) Date of Patent: Jul. 28, 2015

(54) EQUIPMENT AND METHOD FOR SYNCHRONIZING AN INTERNAL MIXER

(75) Inventors: Arnaud Letocart, Clermont-Ferrand Cedex (FR); Gérard Crosnier, Clermont-Ferrand Cedex (FR)

(73) Assignees: COMPAGNIE GENERALE DES ETABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 166 days.

(21) Appl. No.: 13/704,513

(22) PCT Filed: Jun. 14, 2011

(86) PCT No.: PCT/EP2011/059775
§ 371 (c)(1),
(2), (4) Date: Mar. 28, 2013

(87) PCT Pub. No.: WO2011/157677
PCT Pub. Date: Dec. 22, 2011

(65) Prior Publication Data
US 2013/0207313 A1    Aug. 15, 2013

(30) Foreign Application Priority Data

Jun. 14, 2010   (FR) .................................... 10 54678

(51) Int. Cl.
*B29B 7/26* (2006.01)
*B29C 31/00* (2006.01)
*B29B 7/18* (2006.01)

(52) U.S. Cl.
CPC ................ *B29C 31/00* (2013.01); *B29B 7/183* (2013.01); *B29B 7/263* (2013.01)

(58) Field of Classification Search
CPC ............ B29B 7/26; B29B 7/263; B29B 7/582
USPC ......................................... 366/76.7, 76.8, 77
See application file for complete search history.

(56) References Cited

U.S. PATENT DOCUMENTS

| | | | | |
|---|---|---|---|---|
| 1,615,525 | A * | 1/1927 | Simpson ......................... | 366/43 |
| 2,939,616 | A * | 6/1960 | Whittum et al. ............... | 222/512 |
| 2,994,100 | A * | 8/1961 | Comes et al. ................... | 366/77 |
| 3,099,040 | A * | 7/1963 | Matsuoka ........................ | 366/77 |
| 3,237,241 | A * | 3/1966 | Gagliardi ........................ | 366/91 |

(Continued)

FOREIGN PATENT DOCUMENTS

| | | | |
|---|---|---|---|
| CA | 2157419 C | * | 1/2005 |
| CN | 87 1 02395 | | 10/1987 |

(Continued)

*Primary Examiner* — Charles Cooley
(74) *Attorney, Agent, or Firm* — Cozen O'Connor

(57) ABSTRACT

During the process for production of a rubber mass the rubber mass is mixed in a mixing tank (12); then, the mixing of the rubber mass is interrupted; then, with the mixing stopped, the tank (12) is opened by displacing a door (18) for shutting of an opening (16) for discharge of the rubber mass from the tank (12), according to an opening trajectory between a position of shutting of the opening (16), towards a position of release of the opening (16); the positions of shutting and release corresponding to the ends of the opening trajectory; then, with the tank (12) open, the mixing of the rubber mass is restarted when the door (18) is in a predetermined intermediate position of its trajectory between the positions of shutting and release.

5 Claims, 3 Drawing Sheets

(56) References Cited

U.S. PATENT DOCUMENTS

| | | | |
|---|---|---|---|
| 3,349,432 A * | 10/1967 | Breneman | 366/78 |
| 3,352,542 A * | 11/1967 | Matsuoka | 366/77 |
| 3,545,533 A * | 12/1970 | Matsuoka | 165/47 |
| 3,610,585 A * | 10/1971 | MacLeod et al. | 366/149 |
| 3,695,587 A * | 10/1972 | De Marco | 366/77 |
| 4,084,263 A * | 4/1978 | Millauer | 366/84 |
| 4,234,259 A * | 11/1980 | Wiedmann et al. | 366/81 |
| 4,620,793 A * | 11/1986 | Bell | 366/76.7 |
| 4,723,901 A | 2/1988 | Sarumaru | |
| 5,492,403 A * | 2/1996 | Metcalf et al. | 366/77 |
| 7,985,018 B2 * | 7/2011 | Crosnier et al. | 366/77 |
| 2010/0019404 A1 * | 1/2010 | Crosnier et al. | 264/39 |
| 2011/0267919 A1 * | 11/2011 | Naoi et al. | 366/142 |
| 2012/0014206 A1 * | 1/2012 | Yoshida et al. | 366/97 |
| 2013/0207313 A1 * | 8/2013 | Letocart et al. | 264/334 |
| 2015/0036449 A1 * | 2/2015 | Ozawa et al. | |

FOREIGN PATENT DOCUMENTS

| | | |
|---|---|---|
| EP | 1 854 531 | 11/2007 |
| FR | 2961116 A1 * | 12/2011 |
| GB | 119241 A * | 3/1920 |
| GB | 2 173 414 | 10/1986 |
| JP | 11-504566 | 4/1999 |
| WO | WO 96/35507 | 11/1996 |

* cited by examiner

EQUIPMENT AND METHOD FOR SYNCHRONIZING AN INTERNAL MIXER

RELATED APPLICATIONS

This is a U.S. National Phase Application under 35 USC 371 of International Application PCT/EP2011/059775 filed on Jun. 14, 2011.

This application claims the priority of French application no. 10/54678 filed Jun. 14, 2010, the entire content of which is hereby incorporated by reference.

FIELD OF THE INVENTION

The present invention relates to a process and an installation for the production of a rubber mass.

This rubber mass is designed in particular to be used for the production of tires.

BACKGROUND OF THE INVENTION

According to the prior art an installation is known for production of a rubber mass comprising a tank for mixing of the mass.

The tank comprises an opening for loading of the tank, an opening for discharge of the rubber mass, and a door for shutting of the discharge opening. This door is mobile in rotation between a position of shutting of the discharge opening and a position of release of this opening.

The tank also comprises rotary mechanical mixing means such as mixing rotors which are fitted such as to rotate around axes which are substantially parallel to the axis of the door. The tank also comprises a surface for closure of the tank, which is designed to co-operate with a complementary surface for closure of the door in the shutting position of the door.

When the door is opened, a space is created between the complementary closure surfaces. This space forms an aperture for extrusion of the rubber during mixing. Under the effect of the pressure which exists inside the tank, mixed rubber is extruded via this aperture, and a layer of rubber adheres to the complementary closure surfaces.

When the door is in its position of release, the rubber mass drops from the tank. In order to mix a new rubber mass, the door is displaced once more from its position of release into its shutting position.

However, after several cycles of displacement of the door between its positions of release and shutting, a cake of rubber formed by different layers of rubber extruded under pressure accumulates on the complementary closure surfaces, and prevents correct closure of the door.

An operator must then clean these surfaces manually in order to detach the cake of rubber which is adhering to these surfaces. This cleaning is time-consuming, and needs the installation to be stopped throughout the duration of the cleaning, which disrupts the rates of production of rubber. In addition, the presence of an operator involves safety measures consisting of deactivating the installation temporarily, thus disrupting the rates of production further.

SUMMARY OF THE INVENTION

One object of the invention is to prevent the cleaning of the complementary closure surfaces from disturbing the rates of production of the rubber.

One aspect of the invention is directed to a process for production of a rubber mass, wherein:
   the rubber mass is mixed in a mixing tank by means of mechanical means;
   then, the movement of the mechanical means for mixing of the rubber mass is interrupted;
   then, with the mechanical mixing means stopped, the tank is opened by displacing a door for shutting of an opening for discharge of the rubber mass from the tank, according to an opening trajectory between a position of shutting of the opening, towards a position of release of the opening; the positions of shutting and release corresponding to the ends of the opening trajectory;
   then, with the tank open, the movement of the mechanical means for mixing of the rubber mass is restarted when the door is in a predetermined intermediate position of its trajectory between the positions of shutting and release.

The process according to an embodiment of the invention makes it possible to avoid the cleaning of the complementary closure surfaces of the door and the tank, and therefore not to disrupt the functioning of the installation. In fact, by interrupting the mixing whilst the tank is closed, no space is created which could form an extrusion aperture to permit the passage of rubber under pressure. Thus, no layer of rubber is liable to adhere to the complementary closure surfaces of the door and the tank, and no cleaning is necessary in order to assure the correct closure of the door, i.e. the co-operation of the complementary closure surfaces.

By restarting the mechanical mixing means when the door is in the predetermined intermediate position, the aperture which is delimited by the complementary closure surfaces is large enough to eliminate the pressure under which the rubber could have been extruded. By eliminating any risk of extrusion of the rubber under pressure, the rubber mass mixed in the tank is extracted without allowing rubber to accumulate on the complementary closure surfaces. In addition, restarting the mechanical mixing means when the door is in the predetermined intermediate position avoids waiting for the door to be in the position of release in order to extract the mixed rubber mass. The extraction is therefore carried out as a background task.

According to other optional characteristics of the process according to embodiments of the invention, the door is displaced from its shutting position to its opening position according to a uniform continuous movement. A uniform continuous movement corresponds to displacement of the door at constant speed.

Preferably, with the door being mobile in rotation around an axis of the door, and the shutting position corresponding to an angle of opening of 0°, the predetermined intermediate position corresponds to an angle of opening which is greater than, or equal to, a predetermined angle of opening. In other words, the mechanical mixing means are stopped when the angle of opening of the door is smaller than the predetermined angle of opening, and the mechanical mixing means are restarted when the angle of opening of the door is greater than, or equal to, the predetermined angle of opening.

Another aspect of the invention is directed to an installation for production of a rubber mass comprising a tank for mixing of the rubber mass and means for mixing of the rubber mass in the tank, the installation comprising:
   an opening for discharge of the rubber mass;
   a door for shutting of the opening which is mobile between:
      a position of shutting of the opening, and
      a position of release of the opening, means for displacement of the door and means for synchronization between the means for displacement of the door and the mechanical mixing means, the means for synchronization being able to control the implementation of the method as previously defined.

According to other optional characteristics of the installation according to embodiments of the invention:

The door is mobile in rotation around an axis of the door.

The tank comprises a surface for closure of the tank which is designed to co-operate with a complementary surface for closure of the door in the shutting position of the door. By co-operating with one another, the surfaces are in contact with one another, and assure the sealing of the discharge opening.

BRIEF DESCRIPTION OF THE DRAWINGS

FIGS. 1 and 2 represent an installation which is designated by the general reference 10.

Figure 1:
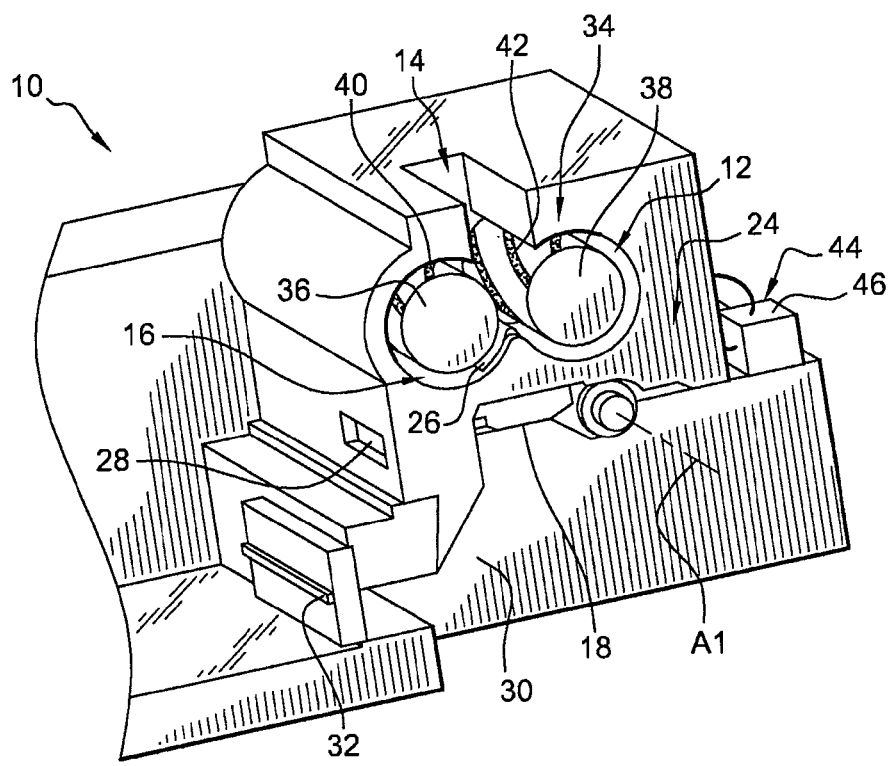
FIG. 1 is a partial view in perspective of an installation according to an embodiment of the invention.

The installation 10 comprises a tank 12 for mixing a rubber mass. The tank 12 comprises an upper opening 14 for filling of the tank, a lower opening 16 for discharge of the rubber mass, and a door 18 for shutting of the opening 16.

Figure 3:
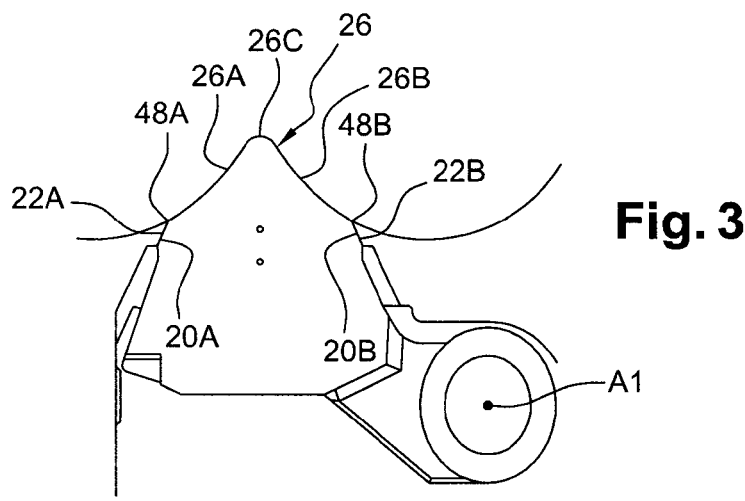
FIGS. 3 to 6 are views in cross section on an enlarged scale of a door of the installation in different positions.
Figure 6:
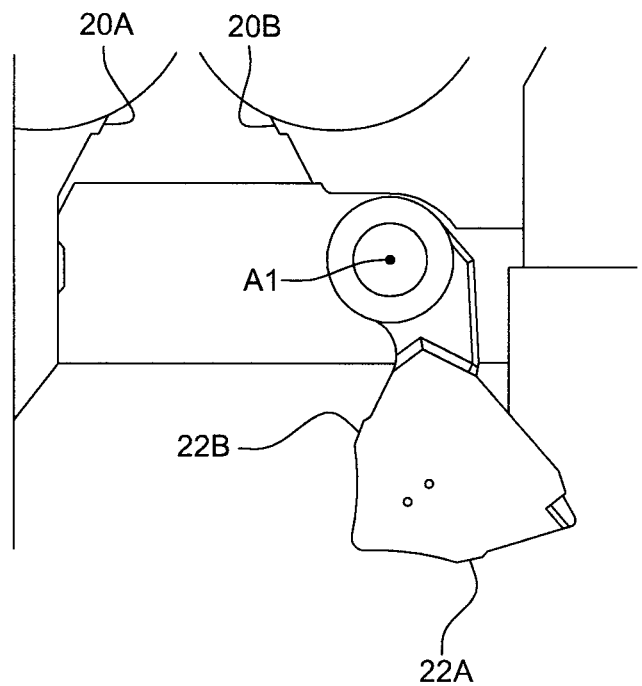

The door 18 is mobile in rotation around a horizontal axis A1 between a position of shutting of the opening 16, represented in FIG. 3, and a position of release of the opening, represented in FIG. 6. The door opens downwards according to an opening trajectory, which in this case is circular, around the axis A1. The positions of shutting and release correspond to the ends of this opening trajectory.

As represented in FIGS. 3 to 6, the tank 12 comprises surfaces 20A, 20B for closure of the tank 12 which is designed to co-operate with complementary surfaces 22A, 22B for closure of the door 18 in the shutting position of the door 18. Each surface 20A, 20B, 22A, 22B comprises at least one part which is defined by generatrices substantially parallel to the axis A1.

The installation 10 comprises motorized means 24 for displacement of the door 18, in this case an electric motor. In addition, the door 18 comprises a so-called inner surface 26, which is designed to delimit the tank in the shutting position. The inner surface 26 is defined by generatrices which are substantially parallel to the axis A1.

In addition, the installation 10 comprises means 28 for locking of the door 18 in the position of shutting of the door 18.

The installation 10 also comprises a dropping space 30 which is situated below the tank 12 and allows the rubber mass to drop from the tank 12 when the door 18 is in the position of release.

In addition, the installation 10 comprises a trap door 32 for access to the space 30.

Finally, the installation comprises mechanical means 34 for mixing of the rubber mass which is present in the tank 12. In this case, the mixing means 34 comprise two rotary mixing rotors 36, 38 which are mobile in rotation around axes R1, R2 which are substantially parallel to the axis A1. Each rotor 36, 38 comprises mixing wings respectively 40, 42.

The installation 10 also comprises means 44 for synchronization between the means 24 for displacement of the door 18 and the mixing means 34.

Figure 2:
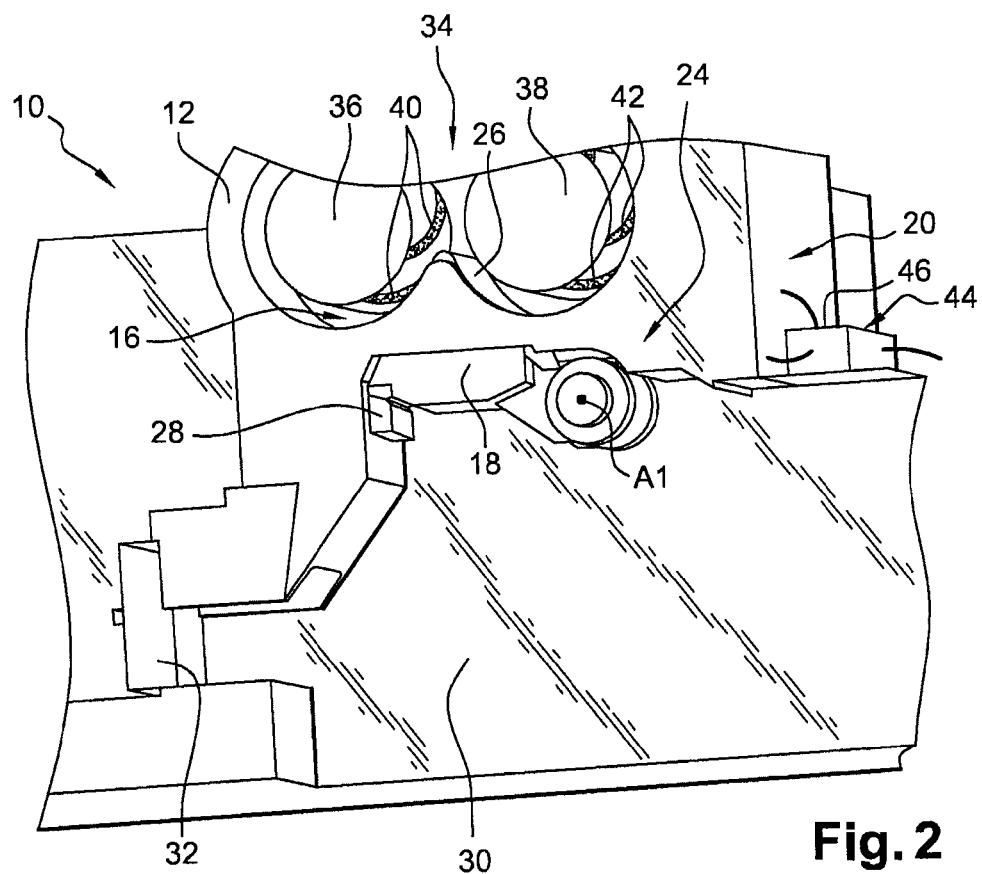
FIG. 2 is another partial view in perspective of the installation in FIG. 1.

As represented in FIGS. 1 and 2, the means 44 for synchronization comprise a control unit 46 which connects the means 24 for displacement and the mixing means 34.

With reference to FIG. 3, the inner surface 26 of the door 18 has two concave portions 26A, 26B which are connected to one another by a convex portion 26C which provides it with the form of a saddle. Each portion 26A, 26B comprises respectively an end edge 48A, 48B which delimits the surface 26.

The installation 10 makes it possible to produce a rubber mass according to the production process, the main steps of which associated with the invention will be described hereinafter with reference to FIGS. 3 to 7.

Figure 7:
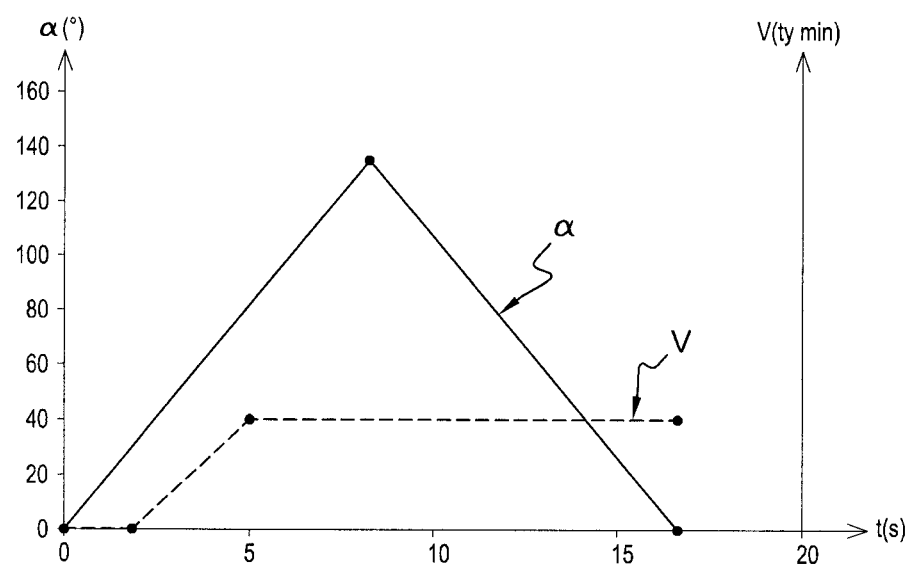
FIG. 7 illustrates the kinematics of the door and the mixing means of the installation in FIG. 1.

FIG. 7 shows the variations of the angle α (in degrees) of opening of the door 18 relative to the shutting position (solid line) and the variations of the speed V (in revolutions per minute) of the rotors 36, 38 (broken lines) on the basis of the time t (in seconds) during a cycle of displacement of the door 18 from its shutting position to its position of release, and from its position of release to the shutting position. During the displacement of the door 18, the displacement of the door 18 and the mixing means 34 are synchronized by means of the synchronization means 44.

Firstly, the tank 12 is loaded with the constituents which are designed to form the rubber mass, via the opening 14. Then, these constituents are mixed in the tank 12 by means of the rotors 36, 38.

FIG. 3 represents the door 18 in the shutting position at the time t=0 s. As illustrated in FIG. 7, at this instant, the mixing of the rubber mass is interrupted by interrupting the operation of the mixing means 34.

Then, with the mixing having been interrupted, the tank is opened. In this case, the door 18 is displaced from its shutting position, illustrated in FIG. 3, to its opening position illustrated in FIG. 6. The door 18 is displaced according to a continuous uniform movement. As a variant, the movement can be non-uniform.

Figure 4:
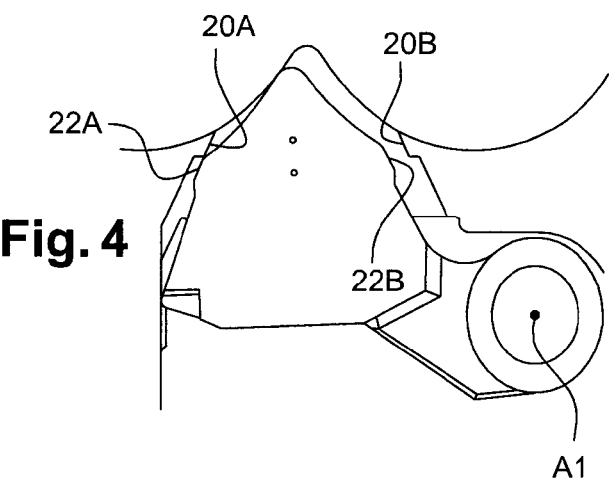

FIG. 4 represents the door 18 at the instant t=1 s in a first predetermined intermediate position of its trajectory between the positions of shutting and release. In order to reach this position, the door has been rotated by an angle of opening of 17° from its shutting position.

Figure 5:
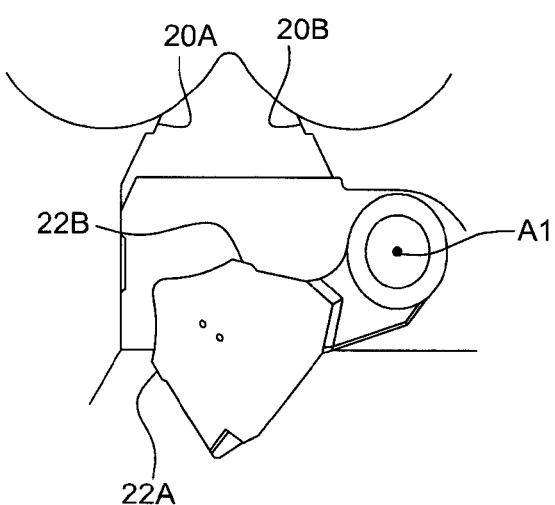

FIG. 5 represents the door 18 at the instant t=2 s in a second predetermined intermediate position of its trajectory between the positions of shutting and release. In order to reach this second intermediate position, the door has been rotated by an angle of opening of more than 17°, in this case approximately 30°, from its shutting position.

Then, once the second predetermined intermediate position has been reached, the rubber mass is extracted from the tank 12. For this purpose, the operation of the mixing means 34 is restarted, in this case the rotation of the rotors 36, 38, according to a regularly accelerated movement between the instants t=2 s and t=5 s, as illustrated in FIG. 7. At the instant t=5 s, the speed of rotation of the rotors 36, 38 becomes constant until the instant t=17.5 s. Thus, the rubber mass is extracted without giving rise to its extrusion via the apertures which are delimited respectively by the complementary closure surfaces 20A, 22A and 20B, 22B.

The restarting of the mixing means 34 has the effect of making the rubber mass which is present in the tank 12 drop into the dropping space 30.

FIG. 6 represents the door in its position of release at the instant t=8.5 s. In order to reach this position of release, the door has been rotated by an angle equal to approximately 135° from its shutting position.

Then, between the instants t=8.5 s and t=17.5 s, the door 18 is displaced from its position of release to its shutting position. During this displacement, the speed of rotation of the rotors 36, 38 remains constant.

The invention is not limited to the embodiments previously described.

In fact, the mixing means could be different from rotors. Similarly the door could have a form different from that of a saddle.

In fact, the trajectories of the inner surface could be different from simple rotation around an axis. Thus, the door could for example have a trajectory derived from the successive or simultaneous combination of:

several rotations around distinct axes of rotation; or
a translation and a rotation; or
several translations.

The invention claimed is:

1. A process for production of a rubber mass comprises:
    mixing the rubber mass in a mixing tank by mechanical means;
    then, interrupting the movement of the mechanical means for mixing of the rubber mass;
    then, with the mechanical means for mixing stopped, opening the tank by displacing a door for shutting of an opening for discharge of the rubber mass from the tank, according to an opening trajectory between a position of shutting of the opening, towards a position of release of the opening, the positions of shutting and release corresponding to the ends of the opening trajectory;
    then, with the tank open, restarting the movement of the mechanical means for mixing of the rubber mass when the door is in a predetermined intermediate position of its trajectory between the positions of shutting and release.

2. The process according to claim 1, wherein the door is displaced from its shutting position to its opening position according to a uniform continuous movement.

3. An installation for production of a rubber mass comprising a tank for mixing of the rubber mass and mechanical mixing means for mixing of the rubber mass in the tank, the installation comprising:
    an opening for discharge of the rubber mass;
    a door for shutting of the opening which is mobile between:
        a position of shutting of the opening,
        a position of release of the opening; and
    means for displacement of the door and means for synchronization between the means for displacement of the door and the mechanical mixing means, the means for synchronization being able to control the implementation of the following steps:
    mixing the rubber mass in the tank by the mechanical mixing means;
    then, interrupting movement of the mechanical mixing means for mixing of the rubber mass;
    then, with the mechanical mixing means stopped, opening the tank by displacing the door for shutting of the opening for discharge of the rubber mass from the tank, according to an opening trajectory between the position of shutting of the opening, towards the position of release of the opening; the positions of shutting and release corresponding to the ends of the opening trajectory;
    then, with the tank open, restarting the movement of the mechanical mixing means for mixing of the rubber mass when the door is in a predetermined intermediate position of its trajectory between the positions of shutting and release.

4. The installation according to claim 3, wherein the door is mobile in rotation around an axis of the door.

5. The installation according to claim 3,
    wherein the tank comprises a surface for closure of the tank which is designed to co-operate with a complementary surface for closure of the door in the shutting position of the door.

* * * * *